T. N. WILSON.
COMBINED SAW SET AND SWAGE.
APPLICATION FILED FEB. 1, 1912.
1,041,547.
Patented Oct. 15, 1912.
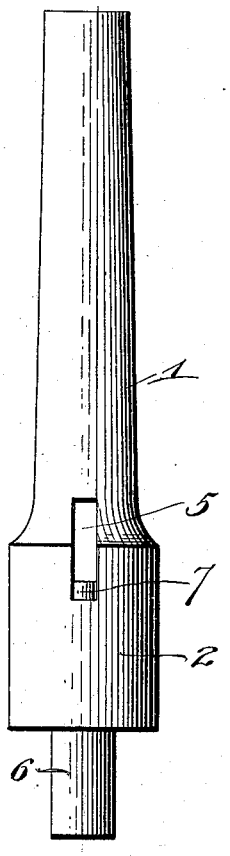
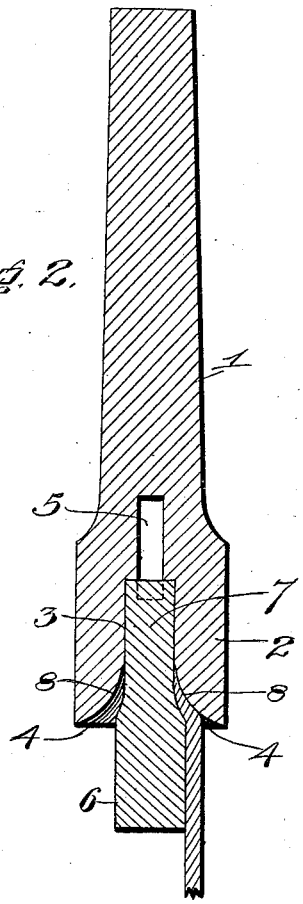
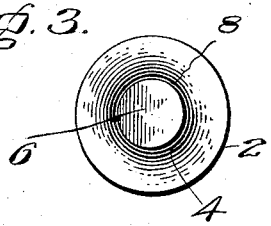
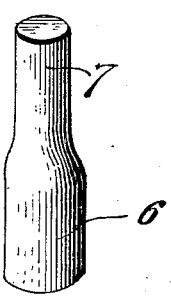
Witnesses
Inventor
Thomas N. Wilson
by
Attorneys

UNITED STATES PATENT OFFICE.

THOMAS N. WILSON, OF SPOKANE, WASHINGTON.

COMBINED SAW SET AND SWAGE.

1,041,547.  Specification of Letters Patent.  Patented Oct. 15, 1912.

Application filed February 1, 1912. Serial No. 674,710.

*To all whom it may concern:*

Be it known that I, THOMAS N. WILSON, a citizen of the United States, residing at Spokane, in the county of Spokane and State of Washington, have invented certain new and useful Improvements in Combined Saw Sets and Swages; and I do declare the following to be a full, clear, and exact description of the invention, such as will enable others skilled in the art to which it appertains to make and use the same.

This invention relates to improvements in combined saw sets and swages.

One object of the invention is to provide a tool of this character by means of which a saw tooth may be swaged, set and channeled at the same time or in one operation.

Another object is to provide a combined saw set and swage which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings; Figure 1 is a side view; Fig. 2 is a vertical longitudinal section showing the device applied to the tooth of a saw; Fig. 3 is a bottom plan view; Fig. 4 is a detail view of the anvil removed from the body of the tool.

My improved saw swage and set comprises a body portion 1 which may be of any suitable size and shape, the same being here shown as preferably of cylindrical form and is provided on one end with a head 2 which is also preferably of cylindrical form and has in its outer end a circular socket 3, the outer end of which is flared or has its sides curved outwardly to meet the outer side of the head 2 as shown at 4. Formed transversely through the head 2 adjacent to the inner end of the socket 3 and intersecting said end of the socket is a transverse slot 5 the purpose of which will be hereinafter described.

Adapted to be engaged with and securely held in the socket 3 is a cylindrical anvil 6 the inner end of which is reduced to form a cylindrical shank 7 which is driven into the socket 3 and fits the same sufficiently tight to hold the anvil in operative position. The reduced portion of the anvil extends into the flared outer end 4 of the socket to a suitable extent to form between the curved annular walls of said flared end and the outer surface of this portion of the anvil, a tapered annular recess 8 to receive the saw teeth when the tool is applied thereto.

In operation the tool is engaged with the saw teeth in the manner shown in the drawing and the outer end of the body 1 is struck with sufficient force by a hammer or other tool, thus forcing the recess 8 between the anvil and the flared outer end of the socket 3 of the set down onto the tooth, which operation will simultaneously set, swage, and channel the tooth. The channel in the tooth is produced by the annular or curved surface of the flared outer end of the socket 3 and the coacting cylindrical surface of the shank 7 of the anvil, these curved surfaces slightly bending the point of the tooth, when forcibly engaged therewith and thus forming the channel therein. In order to permit the anvil 6 to be readily removed from the socket 3 when the anvil has become worn or for any other reason, a wedge shaped instrument of any suitable character is driven into the slot 5 and into engagement with the inner end of the shank 7 of the anvil, thus forcing the latter out of the socket.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A combined saw swage and set comprising a body portion having on one end a head provided with an annular socket, said socket having its outer end flared to form an annular, curved tooth engaging surface, an anvil having a reduced cylindrical shank adapted to be driven into said socket, said anvil projecting a considerable distance beyond the outer end of the socket, and head, and forming an annular tooth receiving space between the same and the annular wall of said socket, whereby when the tool is applied to the teeth of the saw for the purpose of swaging and setting the same, the annular walls of the socket and the shank of the anvil will simultaneously form channels in the teeth.

In testimony whereof I have hereunto set my hand in presence of two subscribing witnesses.

THOMAS N. WILSON.

Witnesses:
S. LLOYD WILSON,
S. A. WILSON.

Copies of this patent may be obtained for five cents each, by addressing the "Commissioner of Patents, Washington, D. C."